(12) United States Patent
Kitabayashi

(10) Patent No.: US 6,976,567 B2
(45) Date of Patent: Dec. 20, 2005

(54) LUBRICATING AND COOLING STRUCTURE OF WET TYPE FRICTION ENGAGEMENT APPARATUS

(75) Inventor: Hisanao Kitabayashi, Chitose (JP)

(73) Assignee: Dynax Corporation, Chitose (JP)

( * ) Notice: Subject to any disclaimer, the term of this patent is extended or adjusted under 35 U.S.C. 154(b) by 21 days.

(21) Appl. No.: 10/778,004

(22) Filed: Feb. 12, 2004

(65) Prior Publication Data

US 2005/0029072 A1     Feb. 10, 2005

(30) Foreign Application Priority Data

Feb. 14, 2003   (JP) .............................. 2003-36055

(51) Int. Cl.[7] .............................................. F16D 13/74
(52) U.S. Cl. .............................. 192/70.12; 192/113.34; 192/188; 192/264 E
(58) Field of Search .................. 192/70.12, 113.34, 192/113.35; 188/71.6, 264 E

(56) References Cited

U.S. PATENT DOCUMENTS

| 4,148,384 | A | * | 4/1979 | Stinson ................. 192/85 AA |
| 4,446,953 | A | * | 5/1984 | Voss et al. ............... 192/70.12 |
| 4,566,572 | A | * | 1/1986 | Flotow et al. ........... 192/70.12 |
| 6,401,896 | B1 | * | 6/2002 | Schnepf .................... 192/70.12 |

FOREIGN PATENT DOCUMENTS

JP          10-9287 A       1/1998

* cited by examiner

Primary Examiner—Richard M. Lorence
(74) Attorney, Agent, or Firm—Howson and Howson

(57) ABSTRACT

A wet-type friction engaging apparatus 10 comprises a friction disk 30 which is fitted by spline with a hub 20 and a mating plate 40 which is fitted by spline with a drum D. The friction disk 30 and the mating plate 40 are arranged alternately, and torque is transmitted when the friction disk 30 and the mating plate 40 are engaged with each other. The inner surface of the hub 20 is in a stepped taper shape in order to let lubricating oil B leak from an opening end 26 of the hub 20, and an oil bore 24 is provided in each step in a radial direction of the hub 20. A periphery of an inlet of each oil bore 24 is in a concave shape. During low-speed rotation when centrifugal force is relatively small, the lubricating oil B leaks from the opening end 26 of the hub 20 and drag torque is reduced, and during high-speed rotation when centrifugal force is relatively large, lubricating oil which splashes from a shaft is securely concentrated and then be drained through the oil bore 24.

2 Claims, 5 Drawing Sheets

LUBRICATING AND COOLING STRUCTURE OF WET TYPE FRICTION ENGAGEMENT APPARATUS

FIELD OF THE INVENTION

The present invention relates to a structure, which enables to lubricate and cool down an engaging section by efficiently supplying cooling/lubricating nil to a wet-type friction engaging apparatus used in a transmission for a motor vehicle or in a transmission for an industrial or construction machinery.

BACKGROUND OF THE INVENTION

Conventionally, a wet-type friction engaging apparatus has been used in such as an automatic transmission for a motor vehicle or a transmission for an industrial or construction machinery etc. as a apparatus to transmit torque or to turn off its transmission.

As shown in FIG. 4, a friction disk 30 and a mating plate 40 are arranged alternately in a drum D of a wet-type friction engaging apparatus and the drum D houses a piston P, which is thrust by operating oil A, pressing the friction disk 30 and the mating plate 40 to be in press contact with each other, and a spring receiver SR, which receives a spring S driving the piston P away from the friction disk 30 and the mating plate 40.

The wet-type friction engaging apparatus 10A transmits torque in its engaging state when the piston P thrusts the friction disk 30 and the mating plate 40, and turns off its transmission of torque in its releasing state when the piston P is driven away from the friction disk 30 and the mating plate 40.

When the wet-type friction engaging apparatus is in its engaging state, the friction disk 30 and the mating plate 40 generate heat to high temperature since they are rubbed against and in press contact with each other. Therefore, the friction disk 30 and the mating plate 40 are cooled down by circulated cooling/lubricating oil B.

A projection which is provided on a opening end 22 of an inner surface of a hub 20 prevents the lubricating oil B from leaking from its end regardless of rotational speed, and thus, all lubricating oil B, regardless of rotational speed, drains through an oil bore 24, be circulated.

However, since such a wet-type friction engaging apparatus 10A needs to be supplied a large amount of lubricating oil B in order to heighten the cooling effect of the friction disk 30 and the mating plate 40, and it causes a problem such that the driving force of an oil pump (not shown) has to be increased.

In addition, if the amount of supply of lubricating oil B is increased in order to heighten the cooling effect, lubricating oil B is regularly churned by the friction disk 30 or the mating plate 40 in the releasing state of the wet-type friction engaging apparatus 10A, and it causes a problem that fuel efficiency would worsen due to so-called "friction loss".

Moreover, since the cooling of the friction disk 30 and the mating plate 40 by the lubricating oil B is required during high-speed rotation, the lubricating oil is often overly supplied during low-speed rotation, which is a usual state of use. Therefore, in a usual state of use, a drag torque is generated due to the viscosity of the lubricating oil B and this causes drag loss and lowering of efficiency.

On the other hand, there is a lubrication and cooling structure of a wet-type clutch (by way of example, refer to Unexamined Japanese Patent Publication No. JP 10-9287A), which may sufficiently cool the engaging section of a wet-type friction engaging apparatus only with a small amount of lubricatinq oil.

This comprises a lubricating oil storage and a lubricating oil supply path, characterized in supplying lubricating oil to the lubricating oil storage through the lubricating oil supply path, and draining it through an opening of the lubricating oil storage.

In this connection, although the title of the invention is "lubrication structure," in JP 10-9287A, the object of the lubricating oil is not only to reduce abrasion of a friction section, but also to release heat, in other words, cool the friction section, and thus it should be referred to as a "lubrication and cooling structure" to be more precise.

It is described therein that according to the invention, sufficient cooling/lubricating oil is supplied to a friction surface; heat is sufficiently transmitted to the lubricating oil; the lubricating oil in the lubricating oil storage moves certainly from an outer diameter side of the friction surface to the opening of the lubricating oil storage to be drained; therefore, heat is not stored in lubricating oil; and as a result, the friction surface may be sufficiently cooled down with only a relatively small amount of lubricating oil.

It is also described therein that when the lubricating oil storage has a lubricating oil drain port, which opens and drains lubricating oil in the lubricating oil storage when friction engaging elements are not engaged, the drag torque of a clutch may be lowered at the time when friction engaging elements are not engaged, and thus, the loss of motive power can be reduced and fuel efficiency can be improved.

However, the lubrication and cooling structure of JP 10-9287A has a difficulty of miniaturizing a wet-type friction engagement apparatus since its structure is complicated and a lot of structural elements are required so as to realize its function.

In view of the above problems, it is an object of the present invention to provide a lubrication and cooling structure of a wet-type friction engaging apparatus, of which structure is relatively simple, and which may reduce drag torque at the time of a usual state of use.

SUMMARY OF THE INVENTION

The present invention solves the above-mentioned problems by providing a lubrication and cooling structure of a wet-type lubrication and cooling apparatus, wherein a friction disk is fitted by spline with a hub; a mating plate is fitted by spline with a drum; said friction disk and said mating plate are arranged alternately; the engagement of said friction disk and said mating plate results in the transmission of torque; and an oil bore is provided in said hub to circulate cooling/lubricating oil, characterized in that the inner surface of said hub is in a stepped taper shape wherein its diameter increases towards the opening end, and said oil bore is provided in each step.

According to the present invention, an inner surface of a hub is in a stepped taper shape wherein its diameter increases toward its opening so that lubricating oil can be leaked from the opening end. Therefore, a large amount of lubricating oil can be drained during low-speed rotation, and as a result, the drag torque of a wet-type friction engaging apparatus in a usual state of use is reduced and fuel efficiency is improved.

DETAILED DESCRIPTION OF PREFERRED EMBODIMENTS

Embodiments of the present invention will be explained referring to FIG. 1.

Figure 1:
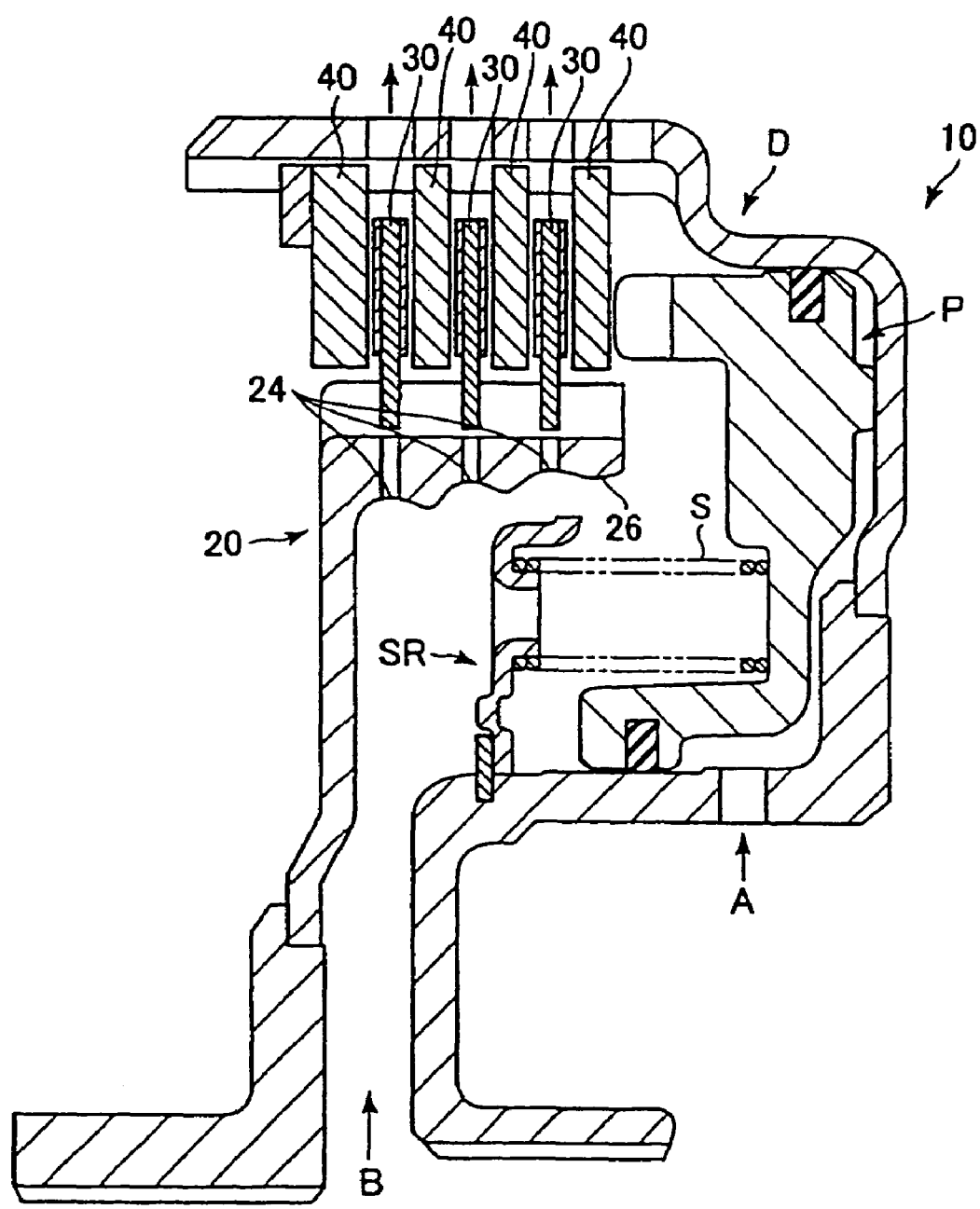
FIG. 1 is a partial cross-sectional view of a wet-type friction engaging apparatus, in which a lubrication and cooling structure according to the present invention is installed.

As shown in FIG. 1, a wet-type friction engaging apparatus 10 comprises a friction disk 30 which is fitted by spline with a hub 20 and a mating plate 40 which is fitted by spline with a drum D. The friction disk 30 and the mating plate 40 are arranged alternately, and torque is transmitted when the friction disk 30 and the mating plate 40 are engaged with each other.

The drum D houses a piston P, which is thrust by operating oil A, pressing the friction disk 30 and the mating plate 40 to be in press contact with each other, and a spring receiver SR, which receives a spring S driving the piston P away from the friction disk 30 and the mating plate 40.

The inner surface of a hub 20 is in a stepped taper shape in order to let lubricating oil B leak from an opening end 26 of the hub 20, and an oil bore 24 is provided in each step in a radial direction of the hub 20. A periphery of an inlet of each oil bore 24 is in a concave shape.

If the inner surface of the hub 20 is not in a stepped shape but simply in a taper shape, most of lubricating oil which splashes from a shaft tends to leak from an opening end. However, since the inner surface of the hub 20 is in a stepped taper shape as described above, lubricating oil which splashes from the shaft can be securely concentrated and be drained through the oil bores 24 during high-speed rotation when centrifugal force is relatively large.

While the angle of taper and the depth of concavity are adjusted depending on condition of use such as amount of lubricating oil and rotational speed, it is preferable that the taper angle is in the range of 5–10 degrees, and the concavity depth is in the range of 0.2–1 mm.

Figure 2:
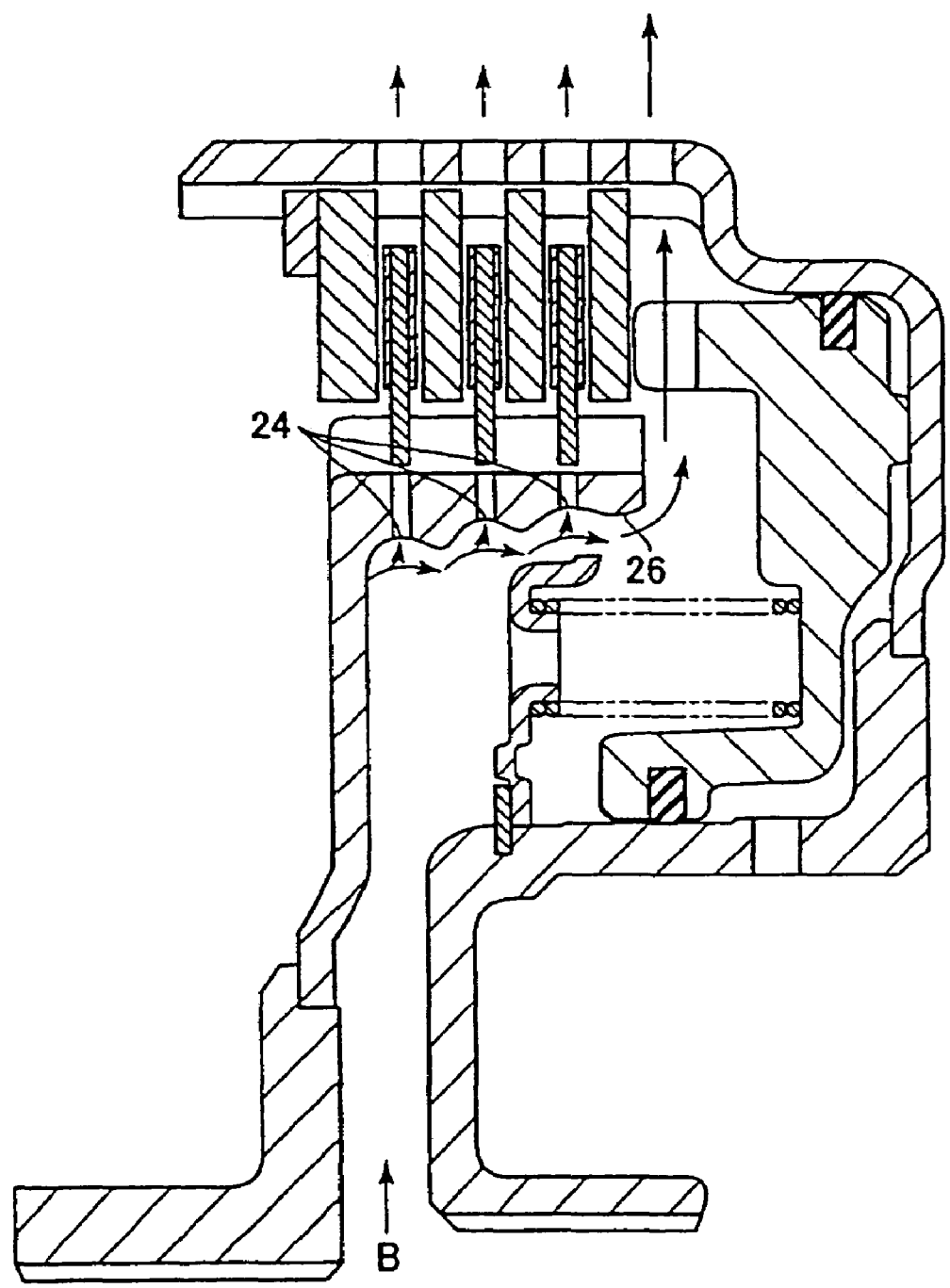
FIG. 2 is an explanatory view which shows the flow of lubricating oil during low-speed rotation of a wet-type friction engaging apparatus of FIG. 1.
Figure 3:
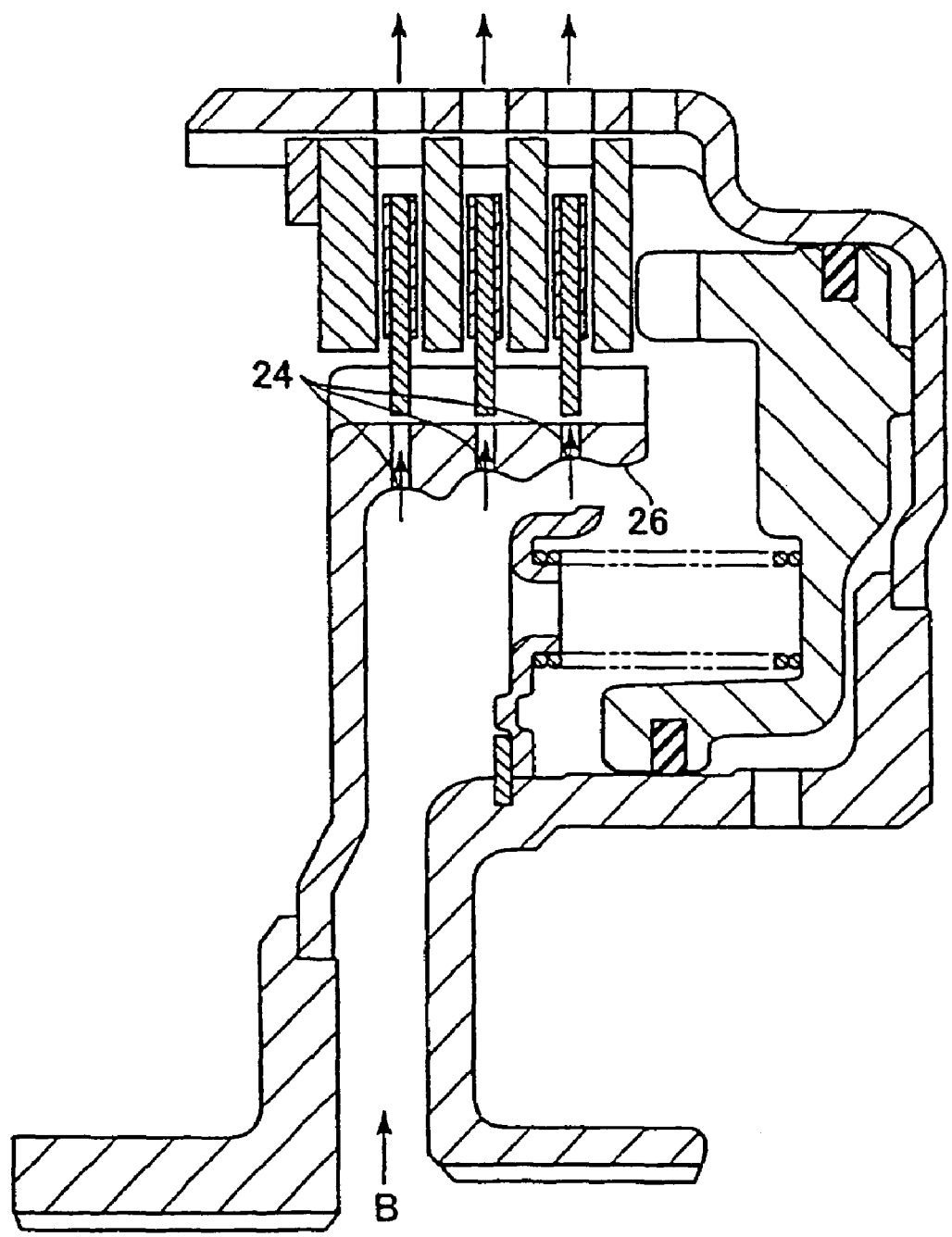
FIG. 3 is an explanatory view which shows the flow of lubricating oil during high-speed rotation of a wet-type friction engaging apparatus of FIG. 1.
Figure 4:
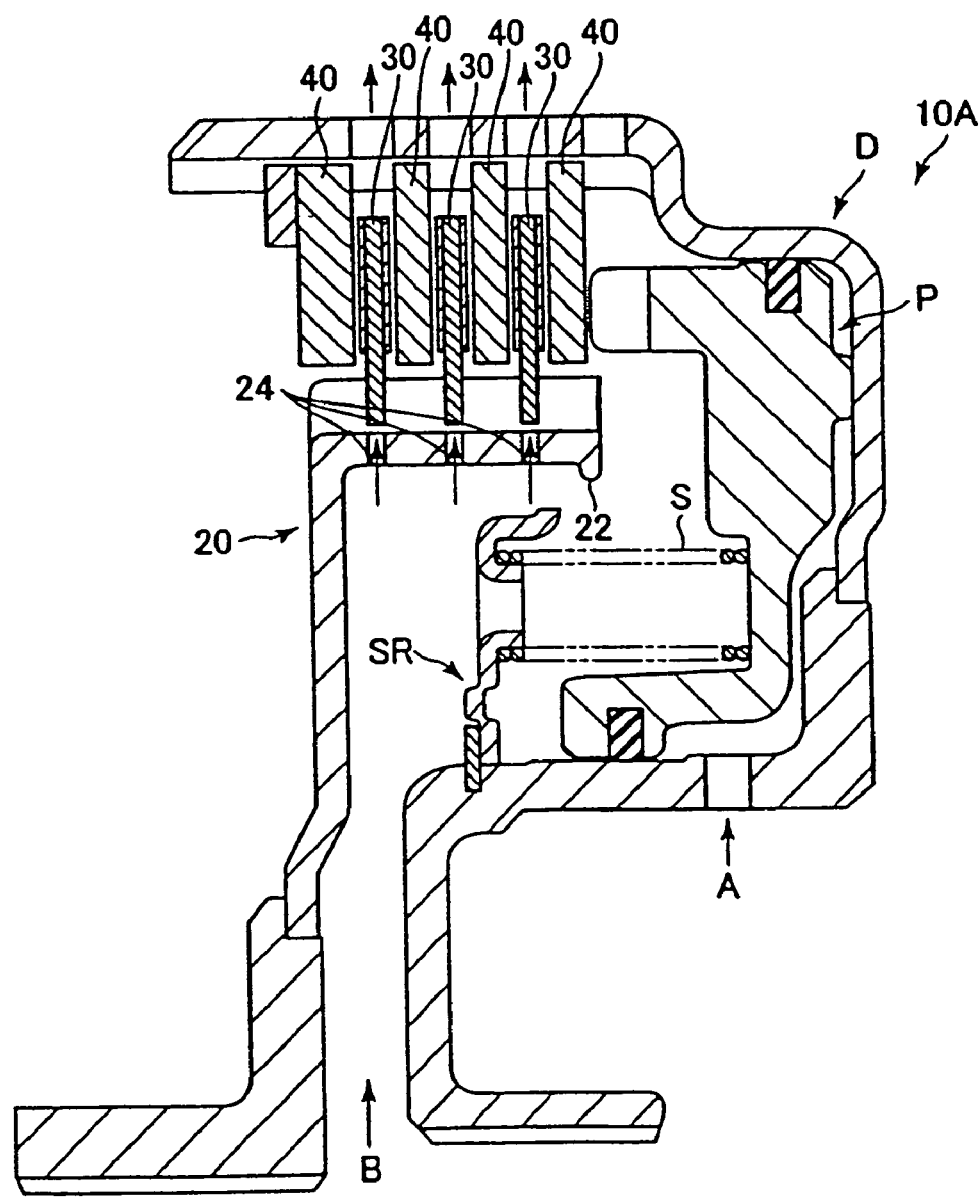
FIG. 4 is a partial cross-sectional view of a conventional wet-type friction engaging apparatus.

Because of the shape described above, during low-speed rotation when centrifugal force is relatively small, the lubricating oil B drains not only through the oil bore 24 but also through the opening end 26 of the hub 20 as shown in FIG. 2, and during high-speed rotation when centrifugal force is relatively large, the lubricating oil B does not leak from the opening end 26 of the hub 20 and most of the lubricating oil is drained through the oil bore 24 as shown in FIG. 3.

As thus described, since more lubricating oil B is drained through the opening end during low-speed rotation in comparison to during high-speed rotation, drag torque of a wet-type friction engaging apparatus in usual state of use is decreased and fuel efficiency is improved.

Figure 5:
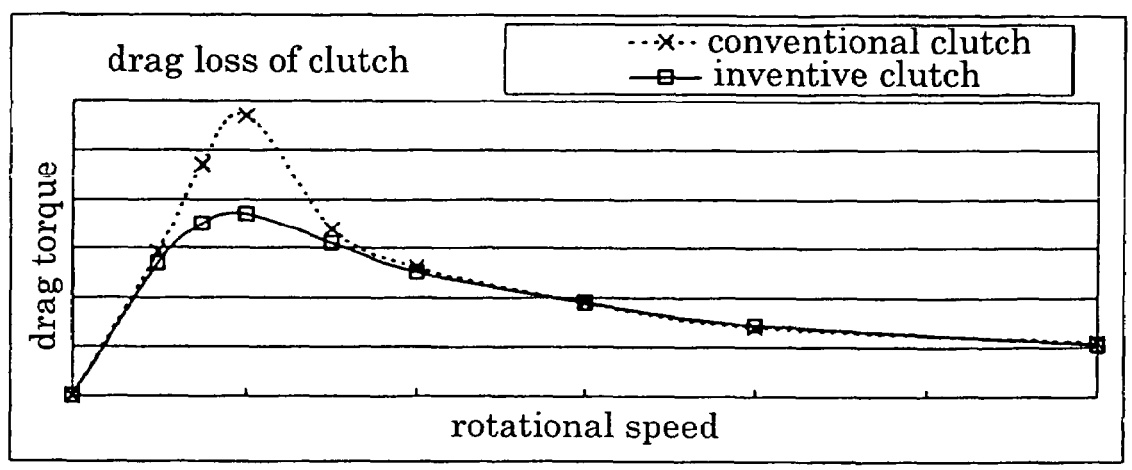
FIG. 5 is a chart showing drag torque of a clutch in which a lubrication and cooling structure according to the present invention is installed and a conventional clutch.

Drag losses corresponding to rotational speeds of a clutch in which a lubrication and cooling structure according to the present invention is installed and a conventional clutch are shown in FIG. 5.

This chart shows that the clutch in which a lubrication and cooling structure according to the present invention is installed has a big effect on reducing drag torque during slow-speed rotation in comparison to a conventional clutch.

According to the present invention, an inner surface of a hub is in a stepped taper shape wherein its diameter increases toward its opening so that lubricating oil can be leaked from the opening end, and this achieves the effects of reducing the drag torque during low-speed rotation which is usual state of use of a wet-type friction engaging apparatus and improving fuel efficiency.

What is claimed is:

1. A lubrication and cooling structure of a wet-type friction engaging apparatus, wherein a friction disk is fitted by spline with a hub; a mating plate is fitted by spline with a drum; said friction disk and said mating plate are arranged alternately; the engagement of said friction disk and said mating plate results in the transmission of torque; and a plurality of oil bores is provided in said hub to circulate cooling/lubricating oil, characterized in that said hub has an inner surface and an opening end, the inner surface of said hub having a plurality of steps, said steps providing the inner surface of the hub with a stepped taper shape whereby the diameter of said inner surface of the hub increases in steps towards the opening end, and an oil bore of said plurality of oil bores is provided in each said step.

2. A lubrication and cooling structure engaging apparatus as claimed in claim 1, wherein a periphery of an inlet of each bore of said plurality of bores is in a concave shape.

* * * * *